Sept. 20, 1932.   C. H. NORDELL   1,877,950
FOLDABLE CURTAIN
Filed July 21, 1930   6 Sheets-Sheet 1
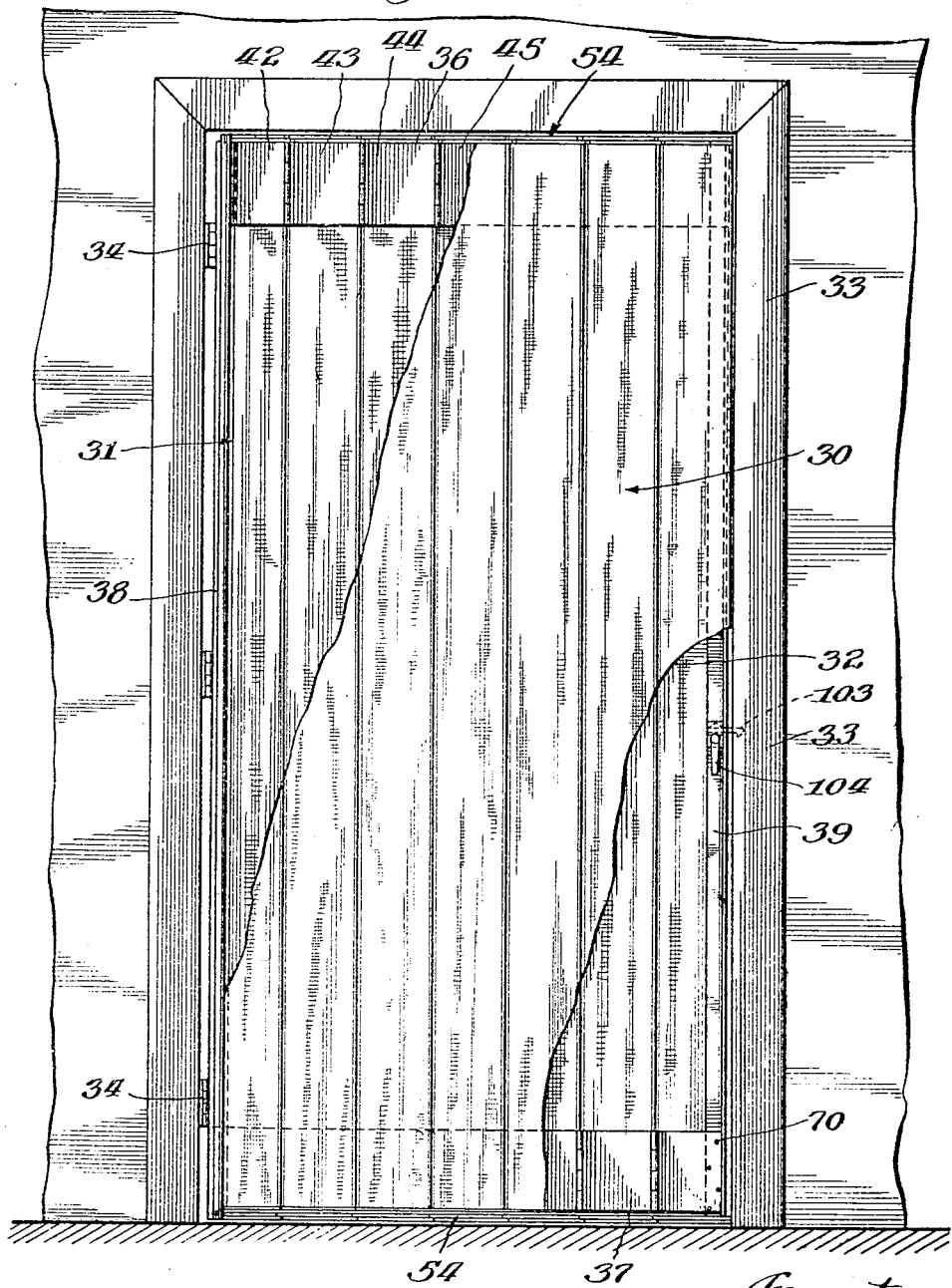

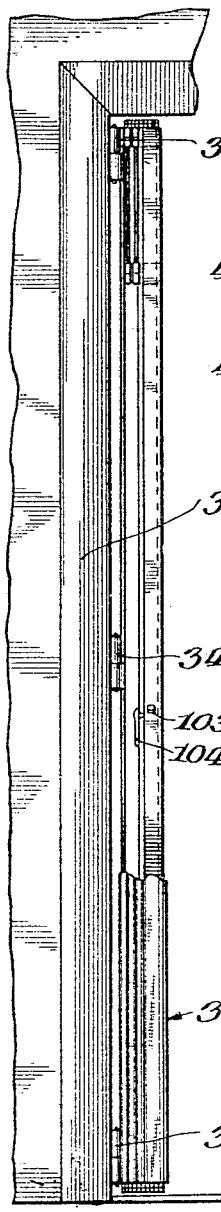

Sept. 20, 1932.   C. H. NORDELL   1,877,950
FOLDABLE CURTAIN
Filed July 21, 1930   6 Sheets-Sheet 3
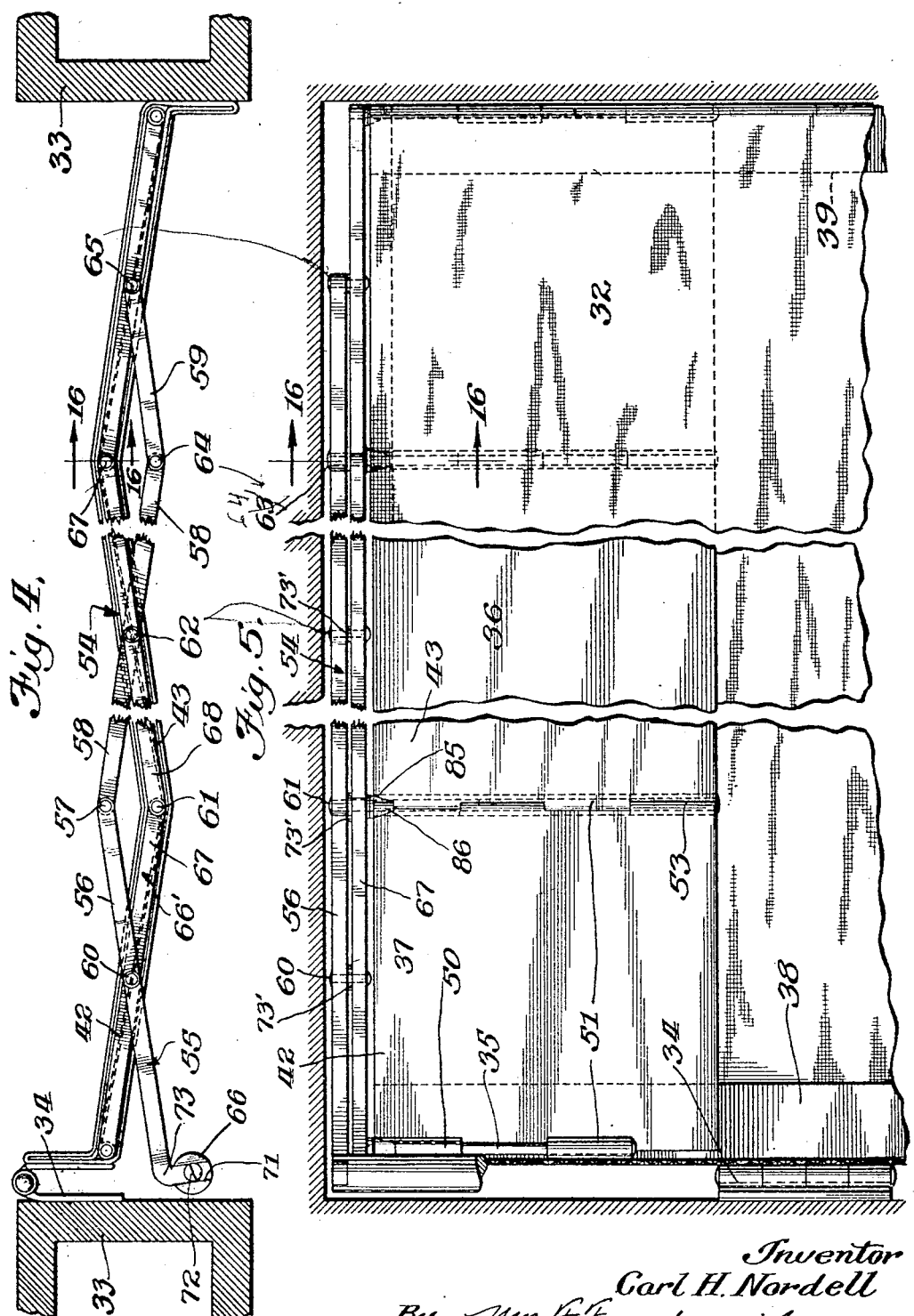

Sept. 20, 1932. C. H. NORDELL 1,877,950
FOLDABLE CURTAIN
Filed July 21, 1930 6 Sheets-Sheet 4
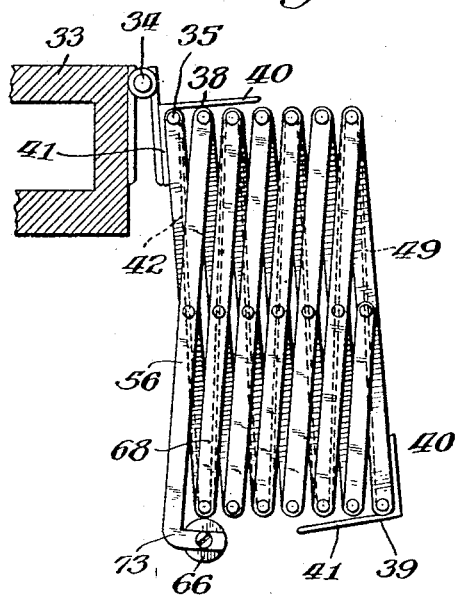
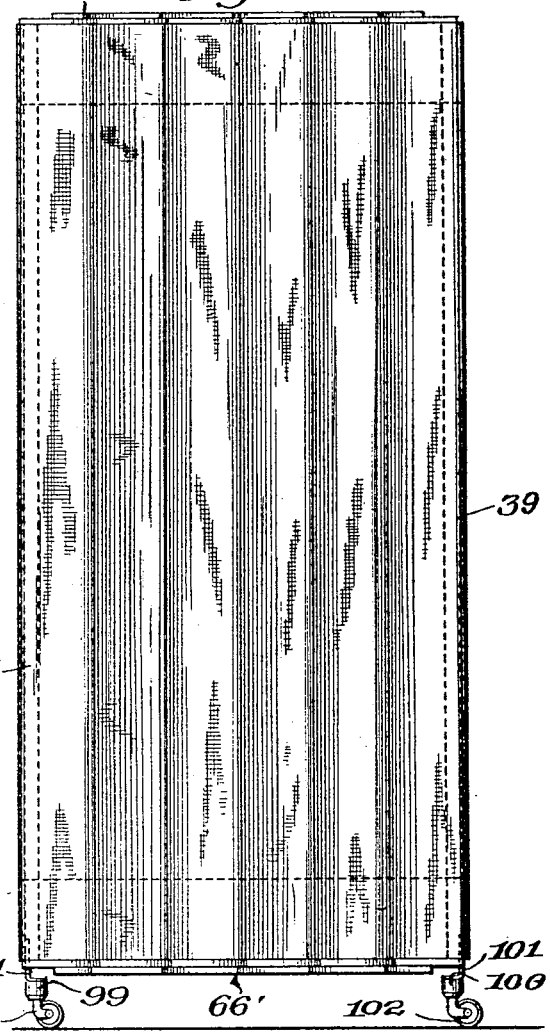
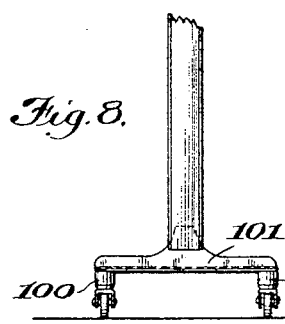
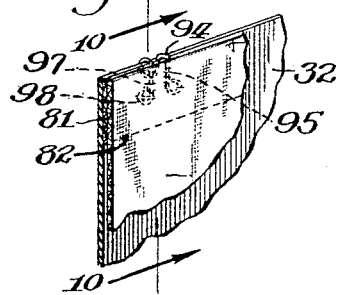
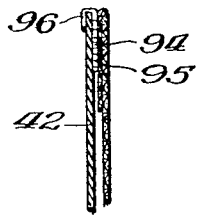
Inventor
Carl H. Nordell,
By Wm. F. Freudenreich,
Attys.

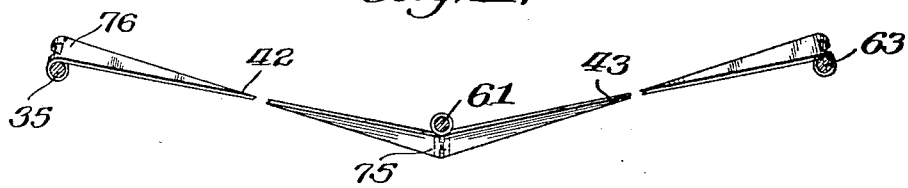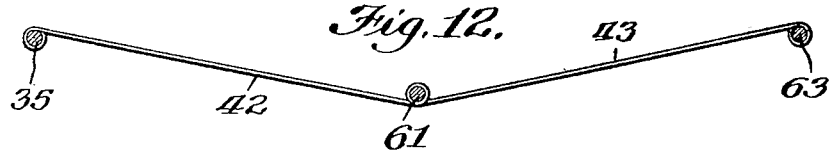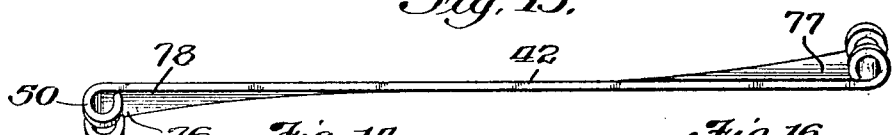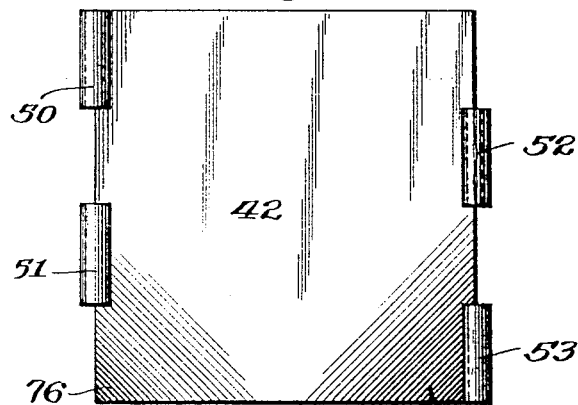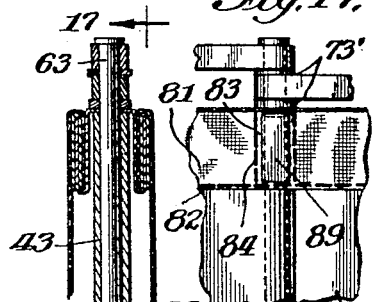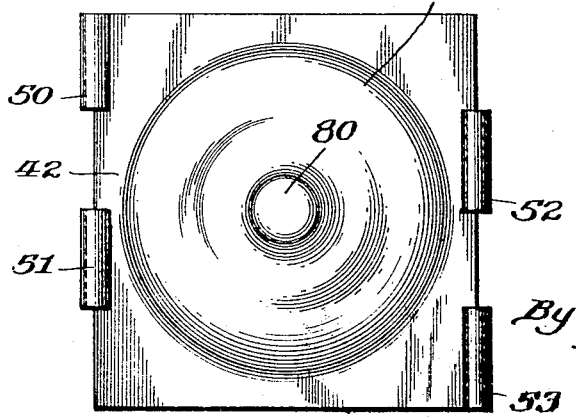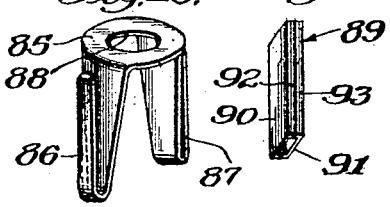

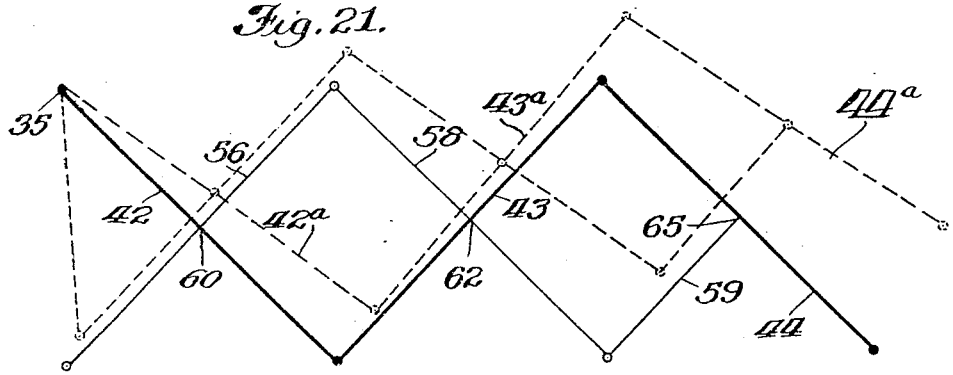
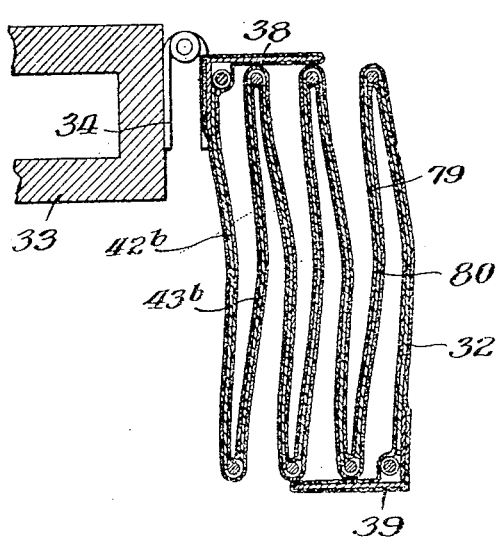
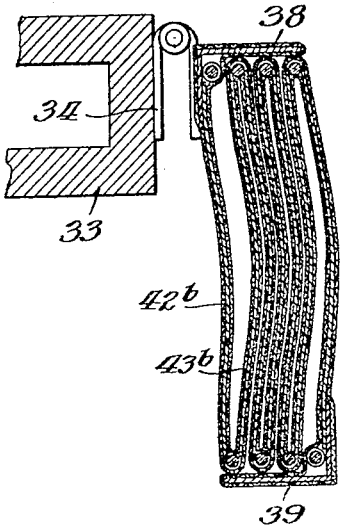

Patented Sept. 20, 1932

1,877,950

UNITED STATES PATENT OFFICE

CARL H. NORDELL, OF CHICAGO, ILLINOIS,

FOLDABLE CURTAIN

Application filed July 21, 1930. Serial No. 469,598.

The present invention relates to foldable curtains and while the features of the invention are applicable to curtains or screens of all sizes, they are of particular importance in connection with relatively light curtains and portable screens.

The present invention may be utilized to provide folding partitions, screens, doors, wall coverings, or closures of any kind, and the extensible frame work alone may be utilized wherever it is advantageous or desirable to provide an extensible frame work or support having the qualities of rigidity and lightness.

One of the objects of the invention is the provision of an improved foldable curtain or screen which is lighter and more economical than the devices of the prior art but which possesses a high degree of rigidity and capability of maintaining the cover taut and smooth under all conditions.

Another object is the provision of an improved foldable curtain or frame work which does not require the use of guides or auxiliary supports in the floor or on the ceiling so that the curtains may be more readily installed in existing buildings without the necessity for cutting the floor to install a guide flush with the surface.

Another object is the provision of an improved foldable curtain which requires less steel and mechanism and structural members than the devices of the prior art thereby decreasing the cost and the weight of the finished product.

Another object is the provision of an improved foldable curtain, many of the parts of which lend themselves readily to manufacture by stamping operations, so that the curtains may be constructed at a lower cost and be placed within the means of a vast number of purchasers and at a cost suitable for residences, apartments, and ordinary dwellings as distinguished from the more elaborate and expensive installations which are required for public buildings, hotels, and halls.

Another object is the provision of an improved foldable curtain or screen to which the covering may be secured in such manner as to provide a substantially uniform tension in the entire curtain as distinguished from the prior devices having spaced points of support and tension, although various modes of securement may be employed.

Another object is the provision of automatic means for compensating for the sag on the curtain due to its weight, means to compensate for the deformation of the frame work when the covering is attached under tension, and means for maintaining the covering under a predetermined tension at all times.

Another object is the provision of an improved curtain structure by means of which the covering may be secured to the extensible frame work at the inner folds or outer folds or preferably at both folds to insure the proper folding of the covering to preserve a more neat and compact formation when the curtain is folded and to permit a greater extension of the curtain and more efficient utilization of the covering.

Another object is the provision of a device of the class described, which is capable of folding into a smaller space, and which is also capable of more complete extension to utilize the full length of the covering and improve the appearance of the extended curtain.

Another object is the provision of an improved framework for folding curtains or the like, which has a high degree of lateral rigidity, and which is adapted to provide a firm, yet sufficiently resilient, support for holding the curtain parts under a predetermined degree of tension.

Another object is the provision of an improved mode of attachment for coverings upon the extensible framework of foldable curtains.

Another object is the provision of an improved foldable curtain framework peculiarly adapted to be used for large curtains or partitions of long span, without the necessity for both upper and lower guides to give the desired lateral rigidity.

Another object is the provision of an improved foldable curtain framework having sufficient vertical rigidity, whereby the entire curtain may be supported from one of the end frame members on a wall or door frame without the necessity for rollers or other supporting means at the free end of the curtain or at regularly spaced intervals beneath the curtain, such as are necessary in the devices of the prior art.

Another object is the provision of an improved extensible frame work for foldable curtains including improved means for assuring the uniform extension of the top and bottom of the curtain at the same time, comprising a torsion member.

Another object is the provision of an improved foldable curtain or screen which is peculiarly adapted to be provided with a conveniently removable covering so that coverings of all kinds may be applied to the frame work by interior decorators, with a minimum of labor, or the curtain may be provided with a plurality of sets of covers for use on different occasions to harmonize with the surrounding furnishings.

Other objects and advantages of the invention will be apparent from the following description and from the accompanying drawings, in which similar characters of reference indicate similar parts throughout the several views.

Referring to the drawings, of which there are six sheets;

Fig. 1 is a side elevational view of a curtain installation used as a closure for an ordinary door opening with parts of the cover broken away to show the mechanism.

Fig. 2 is a similar view with the curtain folded and a part of the covering broken away.

Fig. 3 is a view similar to Fig. 1, of a modified form of foldable curtain.

Fig. 4 is a top plan view of the curtain with a door frame in section, of a curtain of the type of Fig. 1, having an odd number of sections.

Fig. 5 is an elevational view of the mechanism at the top of the curtain of Fig. 4, with a part of the covering removed.

Fig. 6 is a view similar to Fig. 4, with the curtain folded.

Fig. 7 is a view in elevation of a foldable curtain embodied in a portable screen.

Fig. 8 is an end elevational view of a fragment of the screen.

Fig. 9 is a view in perspective showing one mode of securing the flexible covering to the curtain frame.

Fig. 10 is a transverse sectional view taken on the plane of the line 10—10 of Fig. 9.

Fig. 11 is a plan view of a pair of the tension plates utilized in the frame work of the curtain, as the plates would look after they are assembled, and subjected to the strain which is caused by the weight of the frame work and the tension of the covering, if the plates were not given a compensating deformation.

Fig. 12 is a similar view of the tension plates as they appear in the finished curtain.

Fig. 13 is a full sized edge view of one of the tension plates.

Fig. 14 is an elevational view of one of the tension plates.

Fig. 15 is an elevational view of a modified form of tension plate which is provided with a stamped stiffening formation.

Fig. 16 is a sectional view taken on the plane of the line 16—16 of Fig. 5, showing the details of structure of the extensible linkage and one mode of securement of the flexible covering.

Fig. 17 is a sectional view taken on the plane of the line 17—17 of Fig. 16, showing the details of this securing device for the flexible covering.

Fig. 18 is a view in perspective of one of the hook members of Fig. 16 which is used for securing the flexible covering.

Fig. 19 is a view in perspective of one of the metal linings for the hook sockets in the flexible covering.

Fig. 20 is a sectional view on a horizontal plane of a modified form of curtain utilizing the tension plates of Fig. 15, with the curtain in partially folded position.

Fig. 21 is a diagrammatic view showing the relation of the linkage in its actual position to that which it would assume were it not for the torsion members which are provided for assuring the equal extension of the top and bottom of the curtain.

Fig. 22 is a view similar to Fig. 20 with the curtain in completely folded position.

Referring to Figs. 1 to 3, the foldable curtain or screen which is indicated in its entirety by the numeral 30, preferably includes an extensible frame work 31, and a flexible covering 32 which may consist of one or more layers of ornamental heat resisting sound insulating or heat insulating material such as felt upon a fabric base, leather, imitation leather, asbestos, fabric, velour, tapestry or the like.

Any number of layers of flexible covering may be provided depending upon the uses to which the curtain is intended to be put, and if desired the flexible covering may be applied only to one side of the frame work, where the opposite side is not exposed to view, and the term "flexible covering" is applied generically to all types of covering employed, whether or not they completely cover the frame work.

The present foldable curtain may be utilized as a door closure which is a permanent installation such as illustrated in Figs. 1 to 3, or the curtain may be embodied in a portable screen as illustrated in Fig. 7.

In the embodiment of Figs. 1 to 3 the curtain may be supported upon the customary door frame 33 by means of a plurality of ordinary hinges 34 of any type. The hinges 34 are so arranged as to support the weight of the curtain 30 and also preferably arranged to permit the pivotal movement of the curtain when open or folded upon the pintles 35 or the hinge 34 so that the extended curtain may be swung to one side or the other if desired, or the folded curtain may be swung completely out of the door opening around the corner of the door frame 33.

The frame work of the foldable curtain 30 preferably includes extensible members 36, 37 at the top and bottom of the frame and transverse frame members 38, 39 at the sides of the curtain in order to provide a curtain of the shape desired which is usually rectangular in the extended curtain, but curtains of any shape may be made by employing end frame members of appropriate shape. The end frame members 38, 39 preferably consist of structural steel members of a standard shape such as for instance the angle irons 38, 39 (Fig. 6) each having the flanges 40, 41 at substantially right angles to each other.

The structural steel members 38, 39 are peculiarly adapted to provide a very light and strong frame when employed in combination with the improved extensible members 36, 37 described in detail hereinafter, and the end frame members 38, 39 are adapted to resist the unequal extension of the upper and lower parts of the curtain by means of the torsional strength of the end frame members.

The present frame work preferably includes extensible members 36, 37 of the improved type illustrated in Figs. 4, 5, and 11 to 15 inclusive, since these extensible members are peculiarly adapted to compensate for the stresses induced in the frame work by the weight of the finished curtain and the tension of the flexible covering upon the frame work.

By means of the improved extensible members 36, 37 of this type the usual vertical extending stiles or auxiliary frame members at the middle of the curtain may be eliminated, the amount of labor and material necessary in the construction of the curtain may be materially decreased, the cost decreased, and the weight of the curtain made such that it is adapted to be used for portable installations and in many other installations where cost and weight are important factors. Furthermore the reduction in the weight of the curtain and the increased strength, lateral rigidity and vertical rigidity of the finished curtain, whether in the extended position or the folded position, eliminates the necessity for any guides in the floor or on the ceiling, thereby further decreasing the cost of installation and rendering the curtains more adaptable for existing buildings.

Referring to Figs. 1, 4 and 5, the extensible members 36, 37 preferably include a plurality of sheet metal plates 42, 43, 44, 45, etc., the adjacent edges of which are pivotally secured together edge to edge to form an extensible member having plates of metal which extend in the general direction of the plane of the curtain.

Referring to Fig. 14, one of the plates 42 is shown in elevation in this figure, and the tension plate 42 comprises a substantially flat sheet metal member, preferably of substantially rectangular form, and having its opposite edges provided with laterally projecting flanges 50, 51, 52, 53, which are curled into substantially cylindrical formation as shown in Fig. 13 to form bearings for the pintles which pivotally secure the plates 42, 43, etc., together.

The bearings 50 and 51 are preferably offset from the bearings 52, 53, and the bearings on the same edge of each plate are preferably spaced from each other sufficiently so that the bearings 50, 51 on one plate will alternate and align with the bearings 52, 53 on the next adjacent plate in the series of plates.

The bearings 50, 51 on the side adjacent the door hinge 34 or other motive support, are preferably the upper-most bearings on the plate while the bearings 52 and 53 are preferably the lower-most bearings in each plate, so that each of the plates extending toward the right is pivotally supported upon the next adjacent plate at the left and the bearings 52, 53 also act as thrust bearings for supporting the bearings 50, 51 of the next adjacent plate to the right.

In other words, the bearings on the plates 42, 43 are so arranged when the curtain is supported from one side that each plate supports the weight of all the plates extending outwardly toward the opposite side and the outer-most bearings of the plate 42 may be supported on the pintle 35 or the hinge 34 or an ordinary hinge may be employed with one of its flanges secured to the end frame member 38.

In order to provide for the uniform extension of each of the sections or plates 42, 43, etc., the extensible members 36 and 37 may each be provided with a uniformly extensible linkage indicated in its entirety by the numeral 54, and preferably adapted to be supported upon the same pintles which join the plates 42, 43, etc. together. In some embodiments of the invention it is only necessary to provide one series 55 of extensible links preferably pivoted end to end to each other and also pivoted to the plates 42, 43, etc., at substantially the mid point of the plates and links. Thus in the embodiment of Fig. 4 the link 56 is pivoted by means of a rivet 57 to the end of link 58 which in turn may be considered to be pivoted to the end of link 59. The portions broken away in Fig. 4 indicate that any number of links may be employed and consequently it is only necessary to describe the relation of a number of links and plates, since the remainder of the structure is identical.

The link 56 is preferably pivotally secured to the plate 42 at a point which is midway between the ends of link 56 and midway between the edges of plate 42, by means of a pintle 60. The plates 42, 43 are secured together by the pintle 61 and the link 58 is pivotally secured to plate 43 at a point which is midway between the ends of link 58 and midway between the edges of plate 43, such as for instance, the pintle 62 in Fig. 4.

It should be understood that at the ends or side frame members 38, 39, of the frame, the end links such as link 59 need not extend past the pintle 65 unless it is desired to provide the curtain with an auxiliary torsion member 66 such as that attached to the outer end of link 55 at the left of Fig. 4; but such an auxiliary torsion member is not necessary except where an odd number of plate sections is employed.

It will thus be observed that the series 55 of links 56, 58, etc., is associated with the plates 42, 43, etc., in such manner as to provide a uniformly extensible member which may be extended to the position of Fig. 4, or folded, such as for example to the position of Fig. 6.

In the preferred form of the invention the extensible member 36 is preferably provided with another series 66′ of links similar to the series 55 for the reason that this is an economical and advantageous way of providing a support for the pintles 60, 62 and 65 on the plates 42, 43, etc. The tension plates 42, 43 etc., may be very conveniently provided with bearings 52—53 at each end for receiving pintles and the same pintles 61, 63 which join the plates 42, 43, etc., may be utilized for joining the links 67, 68, etc. to the plates. The links 67, 68, etc., are adapted to be fixedly secured to the series of plates 42, 43, etc., by the pintles 61, 63 so that for all intents and purposes the series 66′ of links is adapted to move with the tension plates 42, 43, etc.

However, the link 67 is pivotally secured to the link 56 at a point which is midway between the ends of both links 56 and 67 by a pintle or rivet 60 and it will thus be observed that the series 66′ of links 67, 68, etc., provide a convenient means of connecting the series 55 of links 56, 58, etc., to the mid points of the plates 42, 43, etc.

It should be understood that other modes of pivotally connecting the links 57, 58, etc., to the series of plates 42, 43, etc., may be employed, but the provision of two series of links as illustrated in Fig. 4, enables the pivotal connection of the cross links 56, 58 to the plates at the mid-points without the necessity for forming additional bearings at the mid-point of the plates, thereby simplifying the structure of the plates so that they can be more conveniently formed by ordinary stamping operations.

The end plates of the extensible members 36, 37, such as for instance the plates 42, 49 in Fig. 6, are fixedly secured to the flanges 40 of the end frame members 38, 39 by means of rivets 70 spot welding or other convenient fastening means.

Referring to Fig. 1, it will be noted that the extensible member 37 is similar in form to the extensible member 36 which has been described in detail with respect to Fig. 5, but the extensible member 37 is inverted with respect to extensible member 36 in that the uniformly extensible linkage 54 is located at the bottom of the curtain in the extensible member 37.

The end frame members 38, 39 being fixedly secured to the end plates 42, 49 of extensible members 36, 37, these end frame members maintain the extensible members in fixed spaced relation at the top and bottom of the curtain and the end frame members 38, 39 are also adapted to resist the unequal extension of the curtain at the top and bottom by virtue of the torsional strength of the end frame members and by virtue of the fact that these end frame members are fixedly secured to the end tension plates.

Referring to Fig. 21, this is a diagrammatic illustration of the relation of the linkage under the conditions which are imposed by the torsion of the end frame members and under other conditions, illustrated in dotted lines, which would be present if such end frame members were not employed. The heavy lines of Fig. 21 represent the plates 42, 43, 44 of a relatively narrow curtain having an odd number of plate sections, and the light lines 56, 58, 59, represent the uniformly extensible series of links which are pivotally secured together end to end and pivoted to the plates 42, 43, 44, at the mid points 60, 62, 65. The curtain frame may be considered as supported at the point 35 which is the pintle of one of the supporting hinges at the left of Fig. 1, and the full lines represent the ideal condition which exists in a curtain when both the upper and lower extensible members extend uniformly and conform in plan to the lines of Fig. 21.

Under ordinary conditions the weight of the frame work and curtain tends to cause the upper extensible member 36 to extend and the lower extensible member 37 to contract or fold, but this condition is resisted by the end frame members 38, 39 which are fixedly secured to the end plates 42, 49 or for example, end plate 44 in Fig. 21.

The manner in which the end frame members accomplish the function of preventing unequal extension of the extension member 36, 37 may best be illustrated by considering the effects of such unequal extension on the end frame members 38, 39, and the stresses which are induced on the end frame members by unequal extension. Thus, for instance, suppose the upper extensible member 36 is represented by the dotted lines 42a and suppose the upper extensible member 36 were to extend farther than the lower extensible member 37, under such conditions the plate 42a would move to the dotted line position while the plate 42 would be in the full line position and it will be observed that proceeding from the fixed point 35 the plate 42a is twisted slightly in its position with respect to the position of the plate 42. On account of the uniformly extensible linkage which joins the plates 42a, 43a, 44a, this twisting effect is exemplified still further in the position of the plate 43a shown in the dotted line position and the plate 44a of the upper linkage is twisted still further from the normal position under the assumption that the extensible members 36 and 37 are not uniformly extended.

Under these abnormal conditions the end frame members 38, 39 which fixedly join the plate 42 to the plate 42a and the plate 44 to the plate 44a in Fig. 21, will be subjected to some bending stress, but on account of the relatively thin and light plates which are employed for the tension plates, this bending stress may be taken up in the plates. It is, therefore, found that the end frame members 38, 39 resist unequal extension of the foldable curtain frame at the top and bottom, principally by means of torsional strains induced in the end frame members 38, 39. The torsion members determine the relative position of two of the links of different extensible members and therefore effect their uniform extension.

It is found that the structure described very effectively prevents the unequal extension of the foldable curtain at any point and the curtain may be readily extended by grasping it and pulling either at the top or at the bottom without causing any undue unequal extension at any point. The end frame members 38, 39 are thus maintained substantially parallel to each other at all times, and the torsion of the end frame members alone is sufficient when an even number of plate sections is employed.

When an odd number of plate sections is employed, it is found desirable to extend one of the links of the series 55 such as for instance the link 56, which is extended beyond the pintle 60 in Fig. 4, and a similarly extended link is provided at the bottom extensible member 37. Each of the extensions of the links 56 is fixedly secured in a slot 71 which is formed in the end of the torsion member 66, which may consist of a metal shaft and the links 56 may be secured to shaft 66 by screw bolts 72.

In order that the torsion member 66 may be folded about the edge of the curtain when the curtain is folded, the links 56 are bent laterally at 73 to locate the torsion member 66 as shown in Fig. 6.

The flanges 41 on the end frame members 38, 39 are also adapted to be utilized for enclosing the folds of the curtain when the curtain is in folded position, and it should be noted that the curtain may be folded to a greater extent than that shown in Fig. 6, where the linkage is slightly extended in order to better illustrate the structure of the curtain. The limit of a folding movement of the linkage is reached when the links 56 and 68, for example, and other similar links, are in parallel engagement with each other as illustrated in Fig. 2.

The extensible members 36 and 37 are preferably provided with spacers 73' on the rivets or pintles 60, and similar spacers between the links 56 and 67 and between all similar links, in order to maintain the links in slightly spaced relation and prevent sliding friction between the respective links.

Spacers or washers 73' are similarly employed between the links and between the links and edges of the plates 42, 43 at the pintles 57, 61, and other similar points throughout the extensible mechanism.

Referring to Figs. 11 to 15, I shall now describe the mode of compensation for the weight of the finished curtain and for the relatively high degree of tension which it is found desirable to employ in the flexible covering 32 which is preferably used where the frame work is utilized for a foldable curtain.

As previously stated, the weight of the curtain and the forces exerted upon the extensible members 36 and 37 tend to deform the extensible members and particularly the plates 42, 43, etc., in such manner that the upper extensible member 36 tends to be extended further and the lower extensible member 37 tends to contract, which is resisted and counteracted by the torsion members.

Each of the extensible members is preferably provided with an initial predetermined deformation from its intended position for the purpose of providing the extensible members and the finished frame work with a predetermined tension after the flexible covering has been attached and the curtain supported from its edge.

The upper and lower extensible frame members may be considered as beams resisting the tension of the covering and the upper extensible member is preferably also considered as a cantilever for supporting the weight of the frame and covering in determining the initial deformation of the extensible members. Thus the lower extensible member may be arched downward between the transverse frame members and the upper extensible member may take a form which is the composite result of deformation to act as a beam and as a cantilever. In some embodiments both extensible members may be deformed to compensate for both tension of the covering and sag of the frame.

This initial predetermined deformation of the extensible members is preferably accomplished by giving the plates 42, 43 a predetermined twisted formation so that when the elements of the curtain assume their intended relation, the resilience of the plates permits the plates to be brought back to the normal substantially flat position as shown in Fig. 12.

Fig. 11 is an illustration of a pair of plates 42, 43 showing the deformation of flat plates which is caused by exerting a downward pressure at the pintle 63, the plate 42 being supported on the pintle 35 of the hinge.

The downward pressure at the pintle 63, such as that caused by the weight of the door acting as a cantilever upon the extensible member 36, tends to cause the lower end of pintle 61 to bulge outward to one side of the curtain as shown in Fig. 11, and the lower end of pintle 63 to bulge outward toward the other side of the curtain; that is, the extensible system of plates tends to be further extended at the top of the plates than they are at the bottom of the plates, and this contraction of the extensible member at the bottoms of the plates tends to make the extensible member widen out at the bottom of the plates as shown in Fig. 11, assuming that no initial deformation were provided.

In order to compensate for the deformation of the plates 42, 43, etc., which would inevitably result from the tension of the curtain and the weight of the structure, the plates are each preferably twisted in a direction opposite from that shown in Fig. 11 as illustrated in Fig. 13, for example, the plate 42.

Thus the lower right hand corner 75 is provided with an initial deformation comprising the curving of the corner 75 toward the plane of the drawing, or the corner 75 is curved upward in Figs. 12 and 13. The lower left hand corner 76 may be curved upward from the plane of the drawing in Fig. 14, or downward in Figs. 11 and 13.

The amount of this initial deformation depends upon the span, size and weight of the finished curtain, in which the plates are intended to be used, and the amount of initial deformation is intended to compensate for the weight of the curtain and the tension placed upon the frame work by the desired amount of tension in the flexible covering.

In some embodiments of the invention the upper corners 77 and 78 of the plates may also be given an initial deformation or curvature as for instance the corner 78 may be curved backward oppositely to the corner 76, and the corner 77 may be curved forward oppositely to the corner 75.

In other words, the initial deformation may be taken from one edge of the plate, as for instance, the upper edge in Fig. 13, or the lower edge if desired, or the initial deformation may be taken from a horizontal center line in the plate 42, both the upper and lower parts of the plate being deformed by equal or different amounts depending upon the results sought to be accomplished.

The plates 42 and all of the other parts of the frame work, are preferably formed of resilient metal such as steel, and the plates 42 may be formed by stamping operations which give the plates their predetermined deformation for the particular type of curtain under construction, and the same size plates may be used for various types of curtains by increasing or decreasing the amount of deformation of the plates.

By comparing Figs. 11 and 13 it will be seen that when the forces which have deformed the plate 42 in Fig. 11 are brought to bear upon the plate 42 of Fig. 13; the lower plate being oppositely deformed or twisted, it should assume a position substantially like that of Fig. 12.

The plate 43 of Fig. 12 is, of course, deformed in an opposite direction to that of the plate 42, and in general the deformation of the plates 42, 43 will depend upon the edge from which the plates are supported as a cantilever. The deformation in every case should be such as to compensate for the strains which are placed upon the plates, which are furthermost from the fixed support or frame work.

In curtains of the type of Fig. 7, where the curtain is adapted to be used as a folding screen, the upper and lower extensible members are so deformed as to tend to cause the upper extensible frame member and lower extensible frame member to bulge outward midway between the end frame members 38, 39.

It should also be noted that the curtain preferably has its weight supported from the upper hinges, that is the hinges which are pivotally connected to the upper extensible member 36.

The stiffness of the finished curtain may also be greatly increased by providing the tension plates 42 with a centrally located pressed formation 79 comprising a substantially frusto-conical pressed formation having a centrally located bulge 80. The pressed frusto-conical formation 79 greatly stiffens the finished plate and enables the use of much lighter steel plates than might otherwise be used.

The curtain employing the plates shown in Fig. 15, is illustrated in Fig. 20, the section being taken horizontally in the plane of the upper extensible member 36.

It will be observed that the dished metal tension plates 42b, 43b, etc., are so arranged as to have their depressions all face in the same direction so that the plates may nest in each other, and the flexible covering 32 is also adapted to be received in the depression between the plates.

The curtain may be folded to a greater extent than that shown in Fig. 20, and the end frame members 38 and 39 are adapted to cover the edges of the folded curtain, thereby accomplishing a very compact and neat appearance in the folded curtain as shown in Fig. 22.

The flexible covering 32 for the curtain may be applied to one or both sides of the curtain depending upon the intended use and whether both sides of the curtain are to be exposed to view. A number of different forms of attachment may be employed but the mode of attachment is preferably such as to withstand a considerable degree of tension in the finished covering since the tension in the tension plates 42 is counter-balanced by the weight of the finished curtain and by the tension in the covering 32.

One form of attaching device is illustrated in Figs. 16 to 19, in which the upper and lower edges of the curtain are provided with a folded portion or hem 81 secured in place by one or more lines of stitching 82, and the hem 81 is provided with a plurality of sockets 83 formed by vertically extending lines of stitching 84. The sockets 83 are preferably located at equally spaced points adapted to register with the pintles 61, 63, etc., which join the tension plates 42, 43, etc., and these pintles such as for instance the pintle 63, are each provided with supporting hooked members 85 having upwardly extending hooks 86, 87 for engagement in the sockets 83 of the flexible covering 32.

The hooked member 85 is provided with an aperture 88 for receiving the pintle 63 and the hooked members 85 may be located on the pintles such as pintle 63 above the tension plates 42, 43, and below the extensible linkage 66.

Each of the sockets 83 is preferably provided with a sheet metal lining 89 comprising a strip of sheet metal having two sides 90, 91, bent over substantially parallel to each other and having side flanges 92, 93 bent over toward each other to form a metal lining for the sockets 83.

Another form of attachment for the flexible curtain is illustrated in Figs. 9 and 10, in which the flexible covering 32 is also provided with a hem 81 secured by one or more lines of stitching 82 and the covering 32 is also provided with a multiplicity of hooks 94 sewed to the inside of the curtain with thread 95 adjacent the upper edge of the curtain covering 32. The hooks 94 may consist of relatively short lengths of wire folded together to form a hook having a pair of legs and bent over at 96 to fit over the upper edge of the tension plates 42, 43. The two legs 97 of the hook are preferably formed with eyes 98 to insure the firm securement of the hooks to the covering 32.

In the form of attachment shown in Figs. 16 to 19, the covering 32 is attached at the pivotal juncture between the plates 42, 43, but in the embodiment of Figs. 9 and 10 the covering 32 may be supported at a number of points upon each plate thereby providing a practically continuous mode of attachment for the curtain along the upper and lower edges. The curtain may thus be provided with a substantially uniform tension over the entire surface of the curtain and the covering 32 may be extended to a greater length than the curtains of the prior art, since the covering must necessarily fold with the plates to which it is attached, and the present curtain may be fully extended to substantially flat position if desired.

Referring to Figs. 7 and 8, this is a modification showing the use of a curtain as a folding screen. Such screens are preferably provided with a plurality of legs 99, 100 carried by laterally extending frame members 101 which are fixedly secured to the end frame members 38, 39 by rivets or other convenient fastening means. Each of the legs 99, 100 is preferably provided with a standard form of caster 102, so that the curtain may be rolled from place to place, and the curtain is capable of standing on the legs 99, 100 without any other means of support.

In some embodiments of the invention the casters and legs may be eliminated and the portable curtain supported upon the extensible linkage 66' which projects laterally from the plane of the curtain at its base.

The modification illustrated in Fig. 3 is provided with sheet metal plates 42c, 43c, etc., which extend from the top of the curtain to the bottom of the curtain thereby giving the finished curtain greatly increased lateral rigidity and providing a curtain or closure which cannot be penetrated by cutting through the flexible covering 32.

The details of construction of the frame work of Fig. 3 may be exactly the same as previously discussed with respect to Fig. 1, except that the plates extend from the bottom of the curtain to the top, thereby providing a burglar-proof closure, but one which does not have the advantages of lightness and economy which are present in the preferred embodiment.

Where the curtain is utilized as a door closure, it is preferably provided with a latch 103 adapted to engage an appropriate keeper on the door frame 33 and adapted to be actuated by a handle 104.

The operation of the present foldable curtain is as follows: The curtain may be extended by grasping the frame member 39 and pulling in a substantially horizontal direction where the frame member 38 is fixed to the wall, or in the case of the screen of Fig. 7, by pulling outwardly on both frame members 38, 39. The extensible linkage 54 at the top and bottom of the curtain assures the uniform extension of the various sections, plates or panels of the curtain, and the torsion frame members 38, 39 assure the uniform extension of the top and the bottom of the curtain at the same time, and are maintained substantially parallel to each other on account of the torsional strains which would be caused by the assumption of any other position.

The present curtain may be installed without the necessity for upper and lower guides since the preferred embodiment is capable of self support without guides or rollers and the sag which would otherwise result from the weight of the curtain is compensated by the predetermined initial deformation in the tension plates.

The flexible covering may be given a predetermined tension which is counter-balanced by the tension in the plates and the curtain is adapted to be maintained taut and smooth at all points and in all positions, thereby providing a finished product which enhances the appearance of any interior decorative screen.

The parts of the present curtain lend themselves readily to manufacture by stamping operations so that the present curtains may be manufactured very economically, and the curtains are therefore suitable for installation in private residences, homes, or apartments where the cost of the more complicated and expensive curtains of the prior art which employ a multiplicity of vertical stiles, would be prohibitive.

The covering for the curtain may be changed as readily as any of the other removable furnishings of a room, so that the foldable curtain may always harmonize with the particular scheme of decorations, and the coverings may be readily removed for cleaning.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. A foldable curtain frame comprising a pair of extensible members each having a plurality of pivoted links, and a pair of transverse frame members each having its ends fixedly secured to one of the links of said extensible members whereby the torsion of said transverse frame members resists unequal extension of said extensible members.

2. A foldable curtain comprising a pair of extensible members each having a plurality of pivoted links, a pair of transverse frame members each having its ends fixedly secured to one of the links of said extensible members whereby the torsion of said transverse frame members resists unequal extension of said extensible members and a flexible covering carried by said extensible members and frame members and adapted to be folded or extended with said extensible members.

3. In a foldable curtain, the combination of a plurality of metal plates, pivotally secured together edge to edge to form an extensible member, and a plurality of links pivotally secured together end to end, the links being pivotally mounted on said plates at points between the edges of said plates and ends of said links to cause said plates to be uniformly extended or folded.

4. In a foldable curtain, the combination of a plurality of metal plates, pivotally secured together edge to edge to form an extensible member, and a plurality of links pivotally secured together end to end, the links being pivotally mounted on said plates at points between the edges of said plates and ends of said links to cause said plates to be uniformly extended or folded, and certain of said plates being provided with an initial predetermined deformation to compensate for the stresses on said plates.

5. In a foldable curtain, the combination of a plurality of metal plates, pivotally secured together edge to edge to form an extensible member, a plurality of links pivotally secured together end to end, the links being pivotally mounted on said plates at points between the edges of said plates and ends of said links to cause said plates to be uniformly extended or folded, an extensible member forming another end of a framework and a pair of transverse frame members carried by said plates to maintain said extensible members in spaced relation to each other.

6. In a foldable curtain, the combination of a plurality of metal plates, pivotally secured together edge to edge to form an extensible member, a plurality of links pivotally secured together end to end, the links being pivotally mounted on said plates at points between the edges of said plates and ends of said links to cause said plates to be uniformly extended or folded, an extensible member forming another end of a framework, a pair of transverse frame members carried by said plates to maintain said extensible members in spaced relation to each other, and a flexible covering carried by said extensible members and adapted to be extended or folded thereby.

7. In a foldable curtain, the combination of a plurality of metal plates, pivotally secured together edge to edge to form an extensible member, a plurality of links pivotally secured together end to end, the links being pivotally mounted on said plates at points between the edges of said plates and ends of said links to cause said plates to be uniformly extended or folded, an extensible member forming another end of a framework, a pair of transverse frame members carried by said plates to maintain said extensible members in spaced relation to each other, and a flexible covering carried by said extensible members and adapted to be extended or folded thereby, said flexible covering having a plurality of hooks engaging the outer edges of said plates.

8. In a foldable curtain, the combination of a plurality of metal plates, pivotally secured together edge to edge to form an extensible member, a plurality of links pivotally secured together end to end, the links being pivotally mounted on said plates at points between the edges of said plates and ends of said links to cause said plates to be uniformly extended or folded, a second extensible member of similar structure, and a pair of transverse frame members, carried by the end plates of said extensible members and forming therewith an extensible frame work.

9. In a foldable curtain, the combination of a plurality of metal plates, pivotally secured together edge to edge to form an extensible member, a plurality of links pivotally secured together end to end, the links being pivotally mounted on said plates at points between the edges of said plates and ends of said links to cause said plates to be uniformly extended or folded, a second extensible member of similar structure, a pair of end frame members, carried by the end plates of said extensible members and forming therewith an extensible frame work, and a flexible covering secured to said plates at a multiplicity of spaced points and adapted to be folded or extended with said plates.

10. In a foldable curtain, the combination of a plurality of metal plates having hinges formed at their opposite edges, with pintles for pivotally mounting said plates edge to edge to form an extensible member, said plates extending from the top to the bottom of the curtain, a uniformly extensible linkage carried by said pintles at each end of said plates, and a flexible covering secured to said plates to be extended or folded thereby.

11. In a foldable curtain, the combination of a set of metal plates pivotally secured together edge to edge, to form an extensible member, means for assuring the uniform extension or folding of said plates, a similar set of plates, means for securing said sets of plates in spaced relation to form a framework, and means for covering said framework.

12. In a foldable curtain, the combination of a set of metal plates pivotally secured together edge to edge, to form an extensible member, a similar set of plates, means for joining said sets of plates to form a framework, said plates being provided with an initial predetermined deformation to compensate for sag due to the weight of said framework and any covering that may be applied to the framework.

13. In a foldable curtain, the combination of a set of metal plates pivotally secured together edge to edge, to form an extensible member, a similar set of plates, means for joining said sets of plates to form a framework, a flexible covering carried by said extensible framework under predetermined tension, said plates being formed with a predetermined deformation to compensate for the tension of said covering.

14. In a foldable curtain, the combination of a pair of extensible members and a pair of end frame members for securing said extensible members in spaced relation, said extensible members including a plurality of links and plates pivotally secured together to effect uniform extension, a flexible covering carried by said curtain, and a plurality of hooks for securing said covering on said extensible members.

15. In a foldable curtain, the combination of a pair of extensible members and a pair of end frame members for securing said extensible members in spaced relation, said extensible members including a plurality of links and plates pivotally secured together to effect uniform extension, a flexible covering carried by said curtain, pintles for pivotally securing said links and plates together, and a plurality of hooks carried by said pintles, for securing said covering on said extensible members.

16. A folding screen comprising a stable support, a pair of transverse frame members, a pair of extensible frame members each comprising a plurality of links pivotally secured together end to end, said transverse frame members being fixedly secured to similar links of said extensible frame members to resist torsional strains induced by unequal extension of said extensible members, and a flexible covering carried by one side of said screen.

17. A linkage unit for extensible curtains comprising a resilient metal plate having its opposite edges provided with means for pivotally securing said unit to similar units, said plate being provided with a predetermined warp to compensate for deflection caused by strains on said plate.

18. In an extensible linkage the combination of a pair of resilient metal plates with a pintle and means carried by said plates for engaging said pintle, said means comprising spaced bearings on each plate, a bearing on one of said plates being warped out of alignment with another bearing on said plate.

19. An extensible curtain comprising longitudinal frame members having transversely extending flanges, extensible frame members carried by said longitudinal frame members, and a foldable covering for said frame members, said transversely extending flanges being adapted to substantially enclose said curtain in folded position.

In witness whereof, I hereunto subscribe my name this 18th day of July, 1930.

CARL H. NORDELL.